Jan. 19, 1937.     G. H. ROCKWOOD, JR     2,068,351
GRID CONTROLLED RECTIFIER CIRCUIT
Filed April 23, 1936
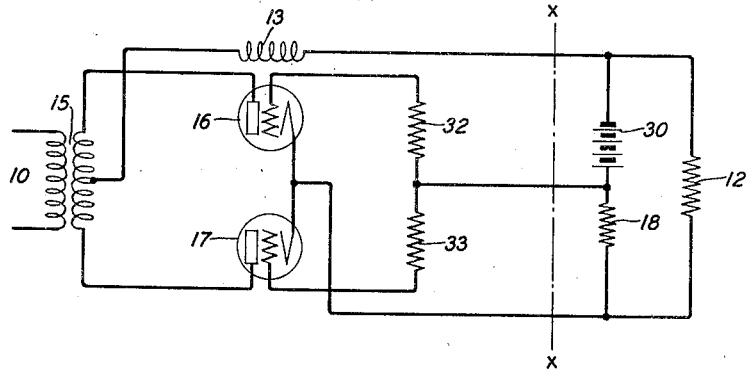
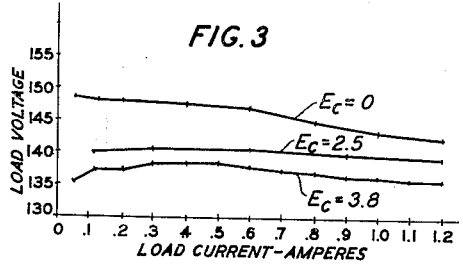
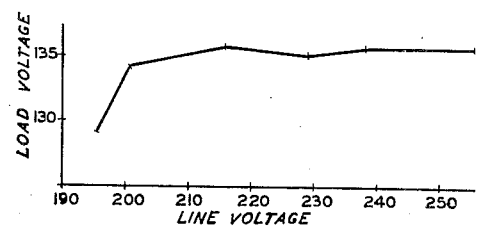
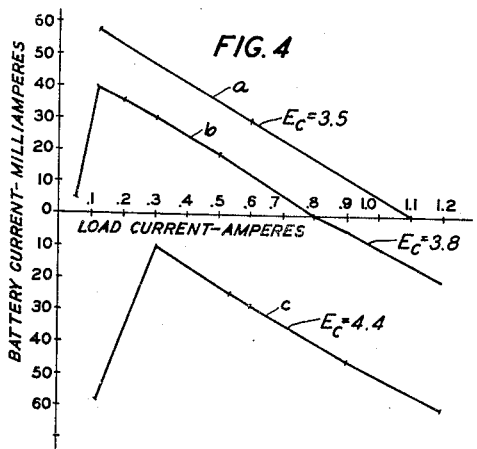
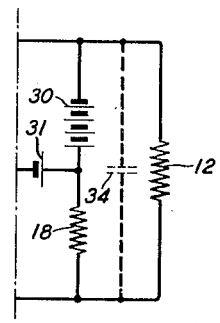
INVENTOR
G. H. ROCKWOOD Jr.
BY
ATTORNEY Patented Jan. 19, 1937

2,068,351

UNITED STATES PATENT OFFICE 2,068,351

GRID CONTROLLED RECTIFIER CIRCUIT

George H. Rockwood, Jr., Orange, N. J., assignor to Bell Telephone Laboratories, Incorporated, New York, N. Y., a corporation of New York Application April 23, 1936, Serial No. 76,912

8 Claims. (Cl. 171—314)

This invention relates to electric power converting systems involving the use of vapor electric discharge devices which function to transmit power from an alternating current source to a direct current load circuit and more particularly to such systems wherein an electric storage battery is adapted to supply the direct current load circuit in the event of an emergency.

It is frequently desirable to float a storage battery on a rectifier in such a manner that the storage battery carries substantially none of the load current but is available for standby or emergency service. In such instances, the rectifier current output should always be equal to the load current.

It is the object of this invention to provide a rectifier circuit arrangement which functions in such a manner as to maintain substantially equal the rectifier output and load currents.

This object is attained in accordance with a feature of the invention by utilizing a grid-controlled rectifier whose grid bias is derived from a resistance connected in series with the storage battery and therefore subject only to current traversing the battery.

A further feature of the invention resides in the use of a variable "C" bias and combining it with the voltage drop across the resistance whereby the magnitude of the battery current may be controlled.

The invention will be readily understood from the following detailed description made with reference to the accompanying drawing in which:

Fig. 1 is a diagrammatic representation of the rectifier circuit embodying the features of this invention;

Fig. 2 shows that portion of the circuit to the right of the broken line in Fig. 1 modified to include a "C" bias;

Fig. 3 illustrates graphically the load regulation obtained by the circuit shown in Fig. 2 for various values of "C" bias;

Fig. 4 illustrates graphically the relation between load current and battery current for various values of "C" bias; and Fig. 5 is a graphic illustration of the manner in which the rectifier circuit compensates for fluctuations in line voltage.

Referring particularly to Fig. 1 of the drawing the rectifier circuit of this invention comprises a pair of vapor electric discharge devices 16 and 17 each comprising an anode, cathode and control grid. The anodes of the tubes 16 and 17 are connected directly to opposite terminals of the secondary winding of transformer 15 whose primary winding is connected to an alternating current supply circuit 10. A connection is established between the mid-point of the secondary winding of transformer 15 to the negative terminal of a direct current load circuit 12 by way of inductance coil 13, the positive terminal of the load 12 being directly connected to the cathodes of the devices 16 and 17.

Connected across the load 12 intermediate the load and the rectifier is a bridge circuit including battery 30 and resistor 18, the latter being connected in series relation with the battery 30 between the positive terminal thereof and the cathode lead to the rectifier tubes.

The grid leads of the devices 16 and 17 including their respective grid resistors 32 and 33 are connected together and to a point corresponding to the junction between the battery 30 and resistor 18.

The grid bias for the rectifier tubes is derived from the resistor 18 which is so placed in the circuit, that is, between the positive terminal of the battery and the cathode lead to the rectifier, that it carries only the battery current. Since the battery may either charge or discharge, the voltage drop across this resistance and, therefore, the grid biasing potential, may change in sign. The action of the rectifier will be to try to maintain the voltage drop across the resistor 18 at zero.

Should the load current fluctuate due to variations in the load 12, there would be a tendency for the battery 30 to charge or discharge, depending upon whether the load current was decreased or increased. For an increase in the current through the load 12 above that of normal operating conditions, the battery 12 would tend to discharge through the load with the result that a discharge current traverses the resistance 18 to effect a potential drop thereacross, causing the grids of tubes 16 and 17 to be biased in such a direction as to effect an increase in the output current of the rectifier. That is, the grids are made less negative with respect to their cathodes and the rectifier output current is increased and brought up to a value corresponding to or equal to that of the load current. With the equalization of the rectifier and load currents the battery loses its tendency to supply the load and the current through the resistance 18 and therefore the voltage drop thereacross is reduced to zero.

In like manner, should the load become light, the battery 30 would tend to charge, drawing current from the rectifier to cause current to traverse the resistance 18 in such a direction as to effect a potential drop differing in sign from that produced by a discharge current. The bias on the tube grids is altered accordingly, that is, the grids are made more negative with respect to their cathodes. The rectifier output current is decreased, accordingly, and caused to approach a value equal to that of the load current. The battery accordingly loses its tendency to charge and the current through the resistance 18 and therefore the voltage drop thereacross is reduced to zero.

By combining a variable "C" bias 31 with the potential drop across the resistor 18, as illustrated by Fig. 3, the magnitude of the battery current may be controlled. As inferred from the previous description, the battery current is a function of the load current. Nevertheless, under normal conditions the battery may be made to take a small constant charge or discharge, as may be desired. This is illustrated by the curves shown in Fig. 4. As shown by curve $a$ of Fig. 4, the "C" potential may be selected at such a value as to maintain a trickle charge on the battery 30 at all times irrespective of the load current within a reasonable upper limit. By increasing the "C" potential the tendency towards discharge of the battery is increased as illustrated by curves $b$ and $c$, the latter indicating a discharge current for all values of load current and the former showing a trickle charge up to about .8 full load of one ampere, and thereafter a discharge.

Since the battery voltage is very nearly equal to the load voltage, it constitutes a standard of voltage for the rectifier circuit. As a result, the rectifier will compensate nicely for fluctuations in the line voltage as illustrated by the curve in Fig. 5.

The magnitude of the resistance 18 is not critical. It need only be large enough so that the required change in grid voltage may be obtained with the maximum permissible drain on the battery. Likewise, the battery current may be made as small as desired by making the resistance sufficiently large.

Should the series resistance 18 be considered to impair the filtering action of the battery, the resistance may be by-passed with an electrolytic condenser such as is indicated at 31.

In Figs. 3 and 4 of the drawing, $E_c$ refers to the independent or "C" bias furnished by the battery 31.

It will be understood that, if desirable, the rectifier circuit illustrated may be employed without the load 12, to charge the battery 30 at a constant current rate by suitable adjustment of the grid bias.

What is claimed is:

1. The combination of a direct current load circuit, an alternating current supply, a vapor electric device connected to rectify the current output of said alternating current supply and transmit it to said direct current load circuit and provided with a control grid, a circuit including a battery and a serially connected resistance connected across the load circuit, and means connecting the grid of said vapor electric device to a point in said circuit between the battery and the resistance.

2. The combination of a direct current load circuit, an alternating current apparatus, a vapor electric device connected to rectify the current output of said alternating current apparatus and transmit it to said direct current load circuit and provided with a control grid, a storage battery connected intermediate the vapor electric device and the load circuit, and means for maintaining a substantially zero current through said battery, said means including a resistor connected to the battery and the control grid of the vapor electric device in such a manner that a biasing potential which varies with the current through the battery is applied to said control grid.

3. The combination of a direct current load circuit, an alternating current supply, a rectifier interposed between said supply and said direct current load circuit for delivering rectified current to said load and having a control grid whose bias determines the output of the rectifier, a battery associated with said rectifier and said load circuit and adapted to be charged by current from said rectifier under predetermined load current conditions, and means for biasing the grid of said rectifier in accordance with the charge current through said battery to regulate the rectifier output accordingly.

4. The combination of a direct current load circuit, an alternating current supply, a rectifier interposed between said supply and said load circuit for transmitting rectified current to said load and having a control grid whose bias regulates the output of the rectifier, a battery associated with said rectifier and said load circuit and adapted to discharge through the load under predetermined load current conditions, and means for biasing the grid of said rectifier in accordance with the discharge current from said battery to regulate the rectifier output accordingly.

5. The combination of a direct current load circuit, an alternating current supply, a rectifier interposed between said supply and said load circuit for transmitting rectified current to said load circuit and having a control grid whose bias determines the output of the rectifier, a battery associated with the rectifier and load in such a manner as to charge or discharge depending upon the value of the current traversing the load circuit with respect to the value of the rectifier output current, and means, including a resistor subject to the charge or discharge current, for biasing the rectifier grid accordingly.

6. The combination of a direct current load circuit, an alternating current apparatus, a vapor electric device connected to rectify the current output of said alternating current apparatus and transmit it to said load circuit and provided with a control grid, a circuit including a battery and a serially connected resistance connected across the load circuit and a connection between the grid of said vapor electric device and a point in said circuit between the battery and resistance, said connection including a source of constant potential.

7. In combination, a direct current load circuit, an alternating current supply, a rectifier connected to transmit power from said supply to said load circuit and having a control grid, a battery adapted to float on said rectifier when the rectifier output current and the load current are equal and means including a resistance connected in series with the battery and associated with said control grid for maintaining the output current of said rectifier substantially equal to the load current.

8. In combination, a source of alternating current, a storage battery and means for charging said battery from said source at a constant rate, said means including a rectifier having a control grid, a resistor connected in series with said battery across the output terminals of said rectifier and a source of grid biasing potential interposed between the control grid of said rectifier and the junction between the battery and resistor.

GEORGE H. ROCKWOOD, Jr.